United States Patent [19]

Visser

[11] Patent Number: 5,753,361
[45] Date of Patent: May 19, 1998

[54] FUSER MEMBER HAVING CHROMIUM OXIDE-FILLED, ADDITION CURED LAYER

[75] Inventor: Susan Ann Visser, Rochester, N.Y.

[73] Assignee: Eastman Kodak Company, Rochester, N.Y.

[21] Appl. No.: 642,067

[22] Filed: May 3, 1996

[51] Int. Cl.$^6$ ............... B32B 5/16; B25F 5/02; F16C 13/00
[52] U.S. Cl. ............ 428/323; 428/328; 428/447; 428/36.92; 492/53; 492/56
[58] Field of Search ............ 428/323, 328, 428/447, 36.92; 492/53, 56

[56] References Cited

U.S. PATENT DOCUMENTS

| | | | |
|---|---|---|---|
| 4,074,001 | 2/1978 | Imai et al. | 428/329 |
| 4,257,699 | 3/1981 | Lentz | 430/98 |
| 4,360,566 | 11/1982 | Shimizu et al. | 428/404 |
| 4,373,239 | 2/1983 | Henry et al. | 429/53 |
| 4,430,406 | 2/1984 | Newkirk et al. | 430/99 |
| 4,454,262 | 6/1984 | Fukayama et al. | 523/262 |
| 4,518,655 | 5/1985 | Henry et al. | 428/392 |
| 4,807,341 | 2/1989 | Nielsen et al. | 492/56 |
| 4,970,098 | 11/1990 | Ayala-Esquilin et al. | 428/36.4 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitzgerald | 428/35.8 |
| 5,336,539 | 8/1994 | Fitzgerald | 428/36.8 |
| 5,466,533 | 11/1995 | Fitzgerald et al. | 428/447 |
| 5,480,724 | 1/1996 | Fitzgerald et al. | 428/447 |
| 5,480,725 | 1/1996 | Fitzgerald et al. | 428/447 |
| 5,587,245 | 12/1996 | Visser et al. | 428/447 |

*Primary Examiner*—Mark Chapman
*Attorney, Agent, or Firm*—Doreen M. Wells

[57] ABSTRACT

A fuser member having a core and a layer overlying the core. The layer includes: an addition crosslinked polyorganosiloxane elastomer, and chromium oxide particles dispersed therein in a concentration of from about 5 to about 50 percent of the total volume of the layer.

20 Claims, No Drawings

FUSER MEMBER HAVING CHROMIUM OXIDE-FILLED, ADDITION CURED LAYER

FIELD OF THE INVENTION

This invention relates to a fuser member useful for heat-fixing a heat-softenable toner material to a substrate. More particularly, the invention relates to a fuser member having improved stability under conditions of elevated temperature and cyclic stress.

BACKGROUND

Heat-softenable toners are widely used in imaging methods such as electrostatography, where electrically charged toner is deposited imagewise on a dielectric or photoconductive element bearing an electrostatic latent image. Generally in such methods, the toner is then transferred to a surface of another substrate, such as a receiver of paper or a transparent film, where it is then fixed in place to yield the desired final toner image. Heat and pressure, in combination are commonly utilized to fix or fuse the toner to the receiver. The heat and pressure are often applied by a pair of opposed members, such as a pair of rollers. As the toner-bearing receiver passes through the nip between the rollers; one of them, usually referred to as a "fuser roll," is heated and contacts the toner-bearing surface of the receiver sheet. The other roller, usually referred to as a "pressure roll," presses the receiver sheet against the fuser roll.

The fuser roll usually comprises a rigid core covered with a resilient material, which will be referred to herein as a "base cushion layer." The resilient base cushion layer and the amount of pressure exerted by the pressure roll serve to establish the area of contact of the fuser roll with the toner-bearing surface of the receiver sheet as it passes through the nip of the pair of rollers. The size of this area of contact helps to establish the length of time that any given portion of the toner image will be in contact with and heated by the fuser roll. The degree of hardness (often referred to as "storage modulus") and stability thereof, of the base cushion layer are important factors in establishing and maintaining the desired area of contact.

Pressure and fuser rolls can have a regular cylindrical shape; however, an advantage is provided in some applications if the rollers are shaped to provide a gradient in pressure along a direction parallel to the axes of the rollers. This can be accomplished by, for example, continuously varying the overall diameter of one of the rollers along the direction of its axis such that the diameter is smallest at the midpoint of the axis and largest at the ends of the axis, in order to give the roller a "bow tie" or "hourglass" shape. The resulting pair of rollers will exert more pressure on the receiver sheet near the ends of the rollers than in the middle. Since a heated roller is generally more subject to permanent deformation on use than is an unheated roller, hourglass shaped, unheated pressure rolls are commonly used with cylindrical, heated fuser rolls. This provides a longer useful life for the more complexly shaped component, but does not address the problem of deformation of the fuser roll. As it is used, the fuser roll permanently deforms to the shape of the pressure roll. This degrades and eventually eliminates the pressure gradient.

In the past, it had been thought that various materials' suitability for use in fuser roll base cushion layers in terms of their stability during use—i.e., their ability to resist degradation (as evidenced by weight loss), creep (permanent deformation), and changes in hardness, during use in fuser rolls—could be determined by subjecting samples of the materials to conditions of continuous high temperature and continuous high stress (i.e., pressure), and then measuring the resultant changes in weight, shape (e.g., length), and hardness (e.g., storage modulus). This has since been disproven. Static testing is not a very good predictor of the stability that materials will exhibit during actual use in fuser roll layers. It has been found that testing based upon the application of cyclic stress is a better predictor of behavior of materials during actual use.

Fuser roll materials can be conveniently tested under conditions of cyclic stress using a Mechanical Energy Resolver (also referred to herein as an "MER"). This device applies heat continuously to maintain the samples at a constant elevated temperature. The device also applies stress to the samples in the form of a compressive force, but does so in a manner such that the amount of compressive force applied varies cyclicly (i.e., sinusoidally). The results of such testing consistently correlate with, and therefore reliably predict, the degree of stability a material will exhibit in the base cushion layer of a fuser roll during actual use.

Another consideration for fuser rolls is the materials that will contact the rolls during use. In a typical electrophotographic process fusing subsystem there are multiple sets of rollers. In order to prevent toner build-up on the rollers, image degradation, hot offset, and toner contamination problems which may decrease roller life, release oil is often applied to the fuser roller. The release oil is typically poly(dimethylsiloxane) oil (also referred to herein as "PDMS oil"), which is selected for its ability to withstand the almost continuous high temperatures (~200° C.) of the electrophotographic fusing process. While PDMS oil does an excellent job in its role as release agent, its compatibility with PDMS-based roller materials results in swelling of the rollers. This swelling cannot be easily compensated for, since it is generally non-uniform. Paper passing over the rollers can wick away some of the release oil within the paper path, resulting in a differential availability of the release oil to roller areas within and outside the paper path. This causes differential swell of the roller inside and outside the paper path so that a "step pattern" is formed in the roller. This can cause problems when different size papers are used and can lead to increased wear and decreased roller life.

One type of material that has been widely employed in the past to form a resilient base cushion layer for fuser rolls is condensation-crosslinked poly(dimethylsiloxane) (also referred to herein as "PDMS") elastomer. The prior art has also taught or suggested that various fillers comprising inorganic particulate materials can be included in such PDMS base cushion layers to improve their mechanical strength and/or thermal conductivity. Higher thermal conductivity is advantageous when the fuser roll is heated by an internal heater, so that the heat can be efficiently and quickly transmitted toward the outer surface of the fuser roll and toward the toner on the receiver sheet it is intended to contact and fuse. Higher thermal conductivity is not so important when the fuser roll is intended to be heated by an external heat source. Disclosure of such filled condensation-cured PDMS elastomers for fuser rolls can be found, for example, in U.S. Patents, U.S. Pat. Nos., 4,373,239; 4,430,406; and 4,518,655.

One specific example of a condensation-crosslinked PDMS elastomer, which contains about 32–37 volume percent aluminum oxide filler and about 2–6 volume percent iron oxide filler, and which has been widely used and taught to be useful in fuser rolls, is sold under the trade name, Stycast 4952, by the Grace Specialty Polymers, U.S.A. However, it has been found that fuser rolls containing Stycast 4952 cushion layers exhibit serious stability problems over time of use, i.e., significant degradation, creep, and changes in hardness, that greatly reduce their useful life. MER test results correlate with and predict the instability exhibited during actual use. Nevertheless, materials such as Stycast 4952 initially provide very suitable resilience, hardness, and thermal conductivity for fuser roll cushion layers.

Some condensation-crosslinked PDMS elastomers that show less change in hardness and creep than Stycast 4952 or aluminum oxide-filled PDMS are disclosed in U.S. Pat. No. 5,480,724 (tin oxide filler), U.S. Pat. No. 5,292,606 (zinc oxide filler), U.S. Pat. No. 5,269,740 (copper oxide filler), U.S. Pat. No. 5,292,562 (chromium oxide filler), and U.S. Pat. No. 5,336,539 (nickel oxide filler).

U.S. Pat. No. 5,480,725 discloses a tin oxide-filled, addition cured polysiloxane system containing 0 to <20 mol % diphenylsiloxane units and the remainder dimethylsiloxane units. U.S. Pat. No. 5,466,533 teaches a zinc oxide-filled, condensation cured poly(diphenylsiloxane-co-dimethylsiloxane) system containing 20–40 wt % zinc oxide and <20 mol % diphenylsiloxane. U.S. Pat. No. 5,587,245 teaches a zinc oxide-filled, addition cured poly (diphenylsiloxane-co-dimethylsiloxane) system containing 5–40 wt % zinc oxide and up to 25 mol % diphenylsiloxane.

U.S. Pat. No. 4,970,098 by J. Ayala-Esquilin, W. H. Dickstein, J. L. Hedrick, Jr., J. C. Scott, and A. C. Yang discloses a poly(diphenylsiloxane-co-dimethylsiloxane) elastomer filled with 40–55 wt % zinc oxide of 100–500 nm particle size, 5–10 wt % graphite of <10 mm particle size, and 1–5 wt % ceric dioxide of 0.2–3 mm particle size. The diphenylsiloxane content was 20–50 wt % (equivalent to 8.5 to 27 mol %).

U.S. Pat. No. 4,807,341 by P. A. Nielsen and J. A. Pavlisko discloses a poly(diphenylsiloxane-co-dimethylsiloxane) elastomer containing 5–15 mol % diphenylsiloxane and 0–5% vinyl-addition crosslinked siloxane units. Aluminum oxide and iron oxide fillers were disclosed.

U.S. Pat. No. 4,074,001 describes fixing rollers for electrophotography which may comprise phenyl-substituted diorganopolysiloxanes filled with calcium carbonate (<10 mm particle size), iron oxide (<10 mm particle size), and titanium dioxide (<10 mm particle size).

U.S. Pat. No. 4,360,566 describes heat fixing rollers for electrophotography that may comprise addition-crosslinked diphenyl-substituted polyorganosiloxanes, filled with substantial amounts (50–250 parts by weight) of siliceous filler.

U.S. Pat. No. 4,454,262 describes silicone rubbers that may contain phenyl radicals and that contain spindle-shaped calcium carbonate filler.

The above references have a variety of shortcomings. Most do not address the issue of improved stability under cyclic stress at elevated temperature. Some of the references call for fillers that are costly.

It would therefore be very desirable to be able to provide a fuser member having a layer which exhibits good stability under conditions of elevated temperature and cyclic stress, i.e., good resistance to degradative weight loss, creep, and changes in hardness.

SUMMARY OF THE INVENTION

The present invention provides a fuser member comprising a support and a layer over said support, said layer comprising: an addition crosslinked non-aromatic substituted polyorganosiloxane elastomer and chromium oxide particles, said chromium oxide particles being present in said layer at a concentration of from about 5 to about 50 percent of the total volume of said layer. The layer on the fuser member exhibits good stability under conditions of elevated temperature and cyclic stress, i.e., good resistance to degradative weight loss, creep, and changes in hardness.

DESCRIPTION OF THE INVENTION

The invention is directed to fuser rolls and, more generally, to what are referred to herein as fuser members. The term "fuser member" is used herein to refer to components of a electrophotographic fusing system that engage a toner-carrying receiver and fuse the toner by means of elevated temperature and pressure. Examples of such components include fuser rolls, pressure rolls, fuser platens, and fuser belts. The term fuser member is also used herein to refer to similar components, subject to similar conditions used in non-electrophotographic equipment.

The fuser member of the invention has a support and one or more layers of elastomer. At least one of the layers (referred to herein as the "A-layer") is addition crosslinked polysiloxane having from about 5 to about 50 volume percent chromium oxide particles as filler. The characteristics of the addition crosslinked chromium oxide-filled polysiloxane are discussed below in detail.

Fuser members in accordance with the invention can have the A-layer as the only elastomer layer or can have the A-layer as a base cushion layer with one or more other layers over the base cushion layer, or can have the A-layer as a top coat or intermediate layer in combination with one or more additional layers. Depending upon the configuration chosen, the wear-resistance and toner-release properties of the base cushion layer may not be important. These properties can be provided by such other layer or layers over the base cushion layer, as is well known in the art. A variety of suitable materials for various fuser member layers are well known to those skilled in the art.

In uses that would place the A-layer in contact with poly(dimethylsiloxane) (PDMS) release oil, it may be desirable to either protect the A-layer by a barrier layer or the like. Materials for the other layer or layers over the A-layer can be chosen to provide a barrier that prevents such release oil from coming into contact with the A-layer, as is also well known in the art. The A-layer may be used without a barrier layer, and in contact with PDMS release oil when toner release or other considerations require it.

For descriptions of other layers and materials that can be coated over base cushion layers, see, for example, U.S. Pat. Nos. 4,375,505; 4,430,406; 4,501,482; and 4,853,737. In some specific embodiments, the A-layer can be coated with poly(vinylidene fluoride-co-hexafluoropropylene), a material commercially available, for example, from DuPont, U.S.A., under the trademark, Viton A. In other specific embodiments, there are two layers over the A-layer, e.g., an oil-barrier layer and, thereover, an outermost layer that provides good wear-resistance and toner-release properties, comprising, for example, a vinyl-addition-crosslinked siloxane having silica and titania fillers dispersed therein, such as is commercially available from Dow-Corning, U.S.A., under the trademark, Silastic E.

Usually, layers overlying a base cushion layer are flexible but thinner than the base cushion layer, so that the base cushion layer can provide the desired resilience to the fuser member, and the other layers can flex to conform to that resilience without having to be resilient themselves. The thickness of the base cushion layer and other layers will be chosen with consideration of the requirements of the particular application intended. For example, base cushion layer thicknesses in the range from 0.6 to 5.0 mm have been found to be appropriate for various applications. In some embodiments of the present invention, the base cushion layer is about 2.5 mm thick, and any oil-barrier and/or wear-resistant toner-release layers thereover are each about 25 to 30 micrometers thick.

The support of the fuser member is usually a core which is cylindrical in shape, and it comprises any rigid metal or plastic substance. Metals are preferred when the fuser member is to be internally heated, because of their generally higher thermal conductivity. Suitable support materials include, for example, aluminum, steel, various alloys, ceramics, polymer/ceramic alloys, and polymeric materials such as thermoset resins, with or without fiber reinforcement.

The addition-crosslinked siloxane elastomer can be formed by the addition reaction of vinyl substituted multifunctional siloxane polymers with multifunctional organohydrosiloxanes. Vinyl substituted multifunctional siloxane polymers and their preparation are well known to those skilled in the art. The vinyl substituted multifunctional siloxane polymers have the following repeating subunits:

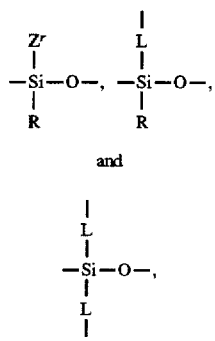

and

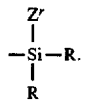

and terminal subunits having the general structure:

$$\begin{array}{c} Z^r \\ | \\ -Si-R. \\ | \\ R \end{array}$$

Designations, such as $Z^r$, R, and L, in all structural formulas herein are used in a uniform manner and have the following meanings.

R is alkyl having from 1 to 8 carbons. Specific examples of R groups include: methyl ethyl propyl, and butyl. R groups can be substituted, however, subsituents should not degrade the characteristics of the resulting elastomer. For example, R groups that react with olefins or organohydrosiloxanes are highly undesirable.

Z is an olefinic group having from 2 to 8 carbons and a terminal vinyl moiety. Specific examples of Z groups include: vinyl and allyl.

$Z^r$ represents Z or R, subject to the limitation that each molecule of vinyl substituted multifunctional siloxane polymer has two or more Z moieties (and thus 2 or more terminal vinyl groups).

L is —O— or —(CH$_2$)$_e$—, where e is an integer from 1 to about 8.

The vinyl substituted multifunctional siloxane polymers can be represented, at least in so far as the currently preferred embodiments of the invention, by the general structure (referred to herein as "structure I"):

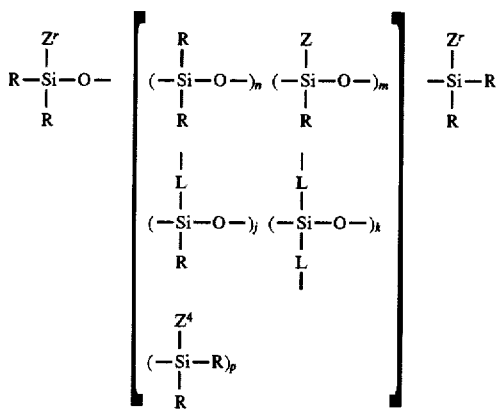

Each repeating subunit that has one or more L moieties (also referred to herein as branching subunits) represents a branch point. Branches may extend outward in the form of a dendrite or star, or may form crosslinks to other chains. The value of p, the number of terminal units on branches, is equal to or less than the total number of branching units, j+2 k, and may be as low as zero if all branching subunits form crosslinks.

The extent of branching or crosslinking of the siloxane polymer is low, since the resulting elastomer would otherwise be excessively hard. If n+m+j+k is defined as being equal to 100 mole percent; then j+k is less than 5 mole percent, and preferably is from 2 mole percent to 0 mole percent. The latter represents a preferred siloxane polymer, in which branching subunits are completely or substantially excluded. For this polymer, structure I can be simplified to the following (structure II):

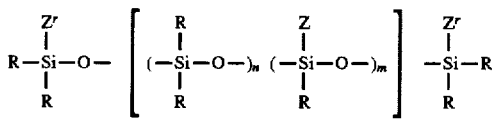

The siloxane polymer has at least two olefinic functionalities (in structures I or II; Z, or $Z^r$, or a combination of Z and $Z^r$). The percentage of silicon atoms substituted by an olefinic moiety can be higher than two, but must be low enough to prevent the resulting elastomer from being excessively hard due to extensive crosslinking. It is preferred that the percentage of silicon atoms substituted by an olefinic moiety is less than 3 percent of the total number of silicon atoms; or, more preferably, less than 2 percent of the total number of silicon atoms.

In particular embodiments of the invention, the value of m is 0 or 1 and $Z^r$ is olefinic. In one such embodiment, structure II can be simplified as (structure III):

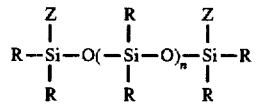

In some other embodiments of the invention, $Z^r$ is R. In one such embodiment, structure II can be simplified as (structure IV):

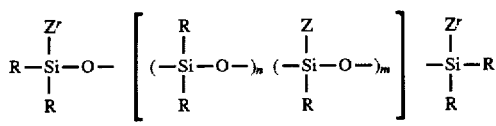

In particular embodiments of the invention, Z or $Z^r$ groups each have the general structure

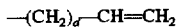

where d is an integer from 0 to about 6 and preferably from 0 to 3. In one such embodiment, the siloxane polymer has the general structure (structure V):

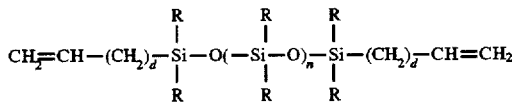

A specific example of such a siloxane polymer is vinyldimethyl terminated polydimethylsiloxane, which has the general structure (Structure VI):

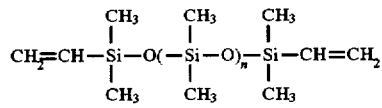

Siloxane polymers having Structure VI are commercially available from United Chemical Technologies, Inc., Piscataway, N.J., under various designations depending upon the viscosity and the value of n.

In another such embodiment, the siloxane polymer has the general structure (structure VII):

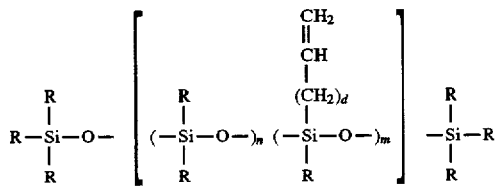

The designations n, m, and d have the same meanings as given above. A specific example of such a siloxane polymer is vinylmethyl siloxane copolymers in which each R is methyl.

In the structural formulas above, the values of n, or n+m, or n+m+j+k, are integers such that the respective polymers have a weight average molecular weight ($M_w$) of from 7,000 to 100,000. If the $M_w$ is above 100,000, the final crosslinked polymer is too unstable under conditions of high temperature and cyclic stress (i.e., there is too much creep and change in hardness over time), even when filler is dispersed therein in accordance with the invention. If the $M_w$ is below 7,000, the final crosslinked elastomer has a high crosslink density that makes the material too hard and brittle, and not resilient enough to serve practically in the A-layer.

The multifunctional organo-hydrosiloxanes that can serve as crosslinking agents for the structure I polymers have the general structure:

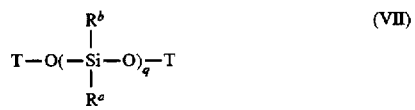

wherein each T represents:

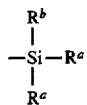

or both T's together represent atoms completing an organohydrosiloxane ring, such that structure VII can be rewritten:

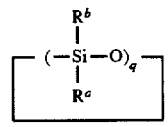

and $R^a$ represents the same groups as R: alkyl having from 1 to 8 carbons. Specific examples of $R^a$ groups include: methyl ethyl, propyl, and butyl. $R^b$ represents H or $R^a$. At least two $R^b$ moieties are H. It is currently preferred that $R^a$ is methyl. It is currently preferred that T be trimethylsilyl. The value of q is from 3 to about 300. A specific example of a suitable multifunctional organo-hydrosiloxane is a material marketed as PS123, by United Chemical Technologies, Piscataway, N.J. This material has the general structure:

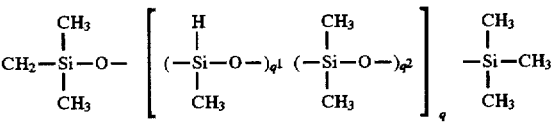

where $q^1+q^2=q$, and a molecular weight of about 2,000 to 2,500. Another example is 1,3,5,7-tetramethylcyclotetrasiloxane, which is also available from United Chemical Technologies.

The addition crosslinking reaction is carried out with the aid of a late transition metal catalyst, such as cobalt, rhodium, nickel, palladium or platinum catalysts. Specific examples of such catalysts include chlorotris (triphenylphosphine) rhodium(I), $RhCl(Ph_3P)_3$; dicobaltoctacarbonyl, $Co_2(CO)_8$; and chloroplatinic acid, $H_2PtCl_6$. Chloroplatinic acid is currently preferred. In a particular embodiment of the invention, the catalyst is added as a complex with vinyl-terminated polysiloxane. Currently preferred is a catalyst complex sold commercially as PC075 by United Chemical Technologies. This material is a complex of chloroplatinic acid and cyclovinylmethyl siloxane and has a platinum concentration of 2 to 3.5 percent. It is also currently preferred that the PC075 complex be diluted with vinyl-terminated dimethylsiloxane polymer to provide a final platinum concentration of from 0.3–1.2 parts per million, depending upon the desired cure rate. A suitable polysiloxane diluent is marketed by United Chemical Technologies as PS441.2 (viscosity=0.2 Pascals second (Pa s)).

The chromium oxide particles employed as filler in the base cushion layer of a fuser member of the invention can be obtained from any convenient commercial source, for example, Aldrich Chemical Company, Milwaukee, Wis. The particle size does not appear to be critical. Particle sizes anywhere in the range of 0.1 to 100 micrometers have been found to be acceptable. In the examples presented below the chromium oxide particles were from 1 to 40 micrometers in diameter.

The chromium oxide filler particles are mixed with the structure (I) polymer and multifunctional organohydrosiloxane crosslinker prior to curing the mix on the fuser member core to form the base cushion layer. The chromium oxide particles comprise from about 5 to about 50 percent, preferably about 10 to about 45 percent and more preferably from about 20 to about 40 percent of the total volume of the base cushion layer. Concentrations less than about 5 volume percent provide lesser degrees of stability. Concentrations greater than about 50 volume percent will render the layer too hard to provide the desired area of contact with the toner-bearing receiver sheet.

In cases where it is intended that the fuser member be heated by an internal heater, it is desirable that the base cushion layer have a relatively high thermal conductivity, so that the heat can be efficiently and quickly transmitted toward the outer surface of the fuser member that will contact the toner intended to be fused. Chromium oxide filler particles increase the thermal conductivity of an addition crosslinked siloxane base cushion layer. When chromium oxide particles are dispersed in the base cushion layer at a concentration of from about 30 to about 50 percent of the total volume of the layer, the thermal conductivity of the layer is at least as high as prior art base cushion layer formulations, such as the previously mentioned Stycast 4952.

To form a fuser member in accordance with the invention, the elastomer having chromium oxide filler is preferably prepared as two part mixtures. The first part contains half of the Structure I polymer, a slight excess of the stoichiometric amount of multifunctional silane to form crosslinks with all the vinyl groups of the Structure I polymer, a small quantity of inhibitor, and half of the appropriate amount of chromium oxide filler. The second part contains the other half of the Structure I polymer, the catalyst, and the other half of the appropriate amount of chromium oxide filler. The two parts individually are thoroughly mixed on a three-roll mill or by another mixing method known to those skilled in the art. The two parts are then combined with thorough stirring. The outer surface of a rigid core is scrubbed clean, rinsed with hot water and dried. The core is then wiped with isopropyl alcohol or other suitable solvent. To the core is applied by brush a thin layer of primer, e.g., DC92-023 commercially available from Dow Corning. The primer is dried in air for 1 hour.

The combined mix is then degassed and injected into a mold surrounding the fuser member core to mold the material onto the core. The covered core remains in the mold for a time sufficient for some crosslinking to occur (e.g., 2 hours at 175° C.). The covered roller is then removed from the mold and heated to complete the remaining crosslinking. For example, it could be heated ramp to 200° C. over the course of 2 hours and held at 200° C. for an additional 8 hours. After cooling to room temperature, the roller can be ground to provide a desired surface.

Additional layers can be coated over or under the elastomer having chromium oxide filler. One preferred overlayer is poly(vinylidene fluoride-co-hexafluoropropylene). The application of these materials to fuser members has been disclosed previously in the prior art.

The following experimental results are presented to further illustrate some specific layer compositions in accordance with the invention and to compare their properties with compositions not within the scope of the invention. The chromium oxide used was obtained from Aldrich Chemical Company, Milwaukee, Wis. and had a volume mean particle size of 9 μm and a particle size range of 1–40 μm. The aluminum oxide used was T64 tabular alumina, obtained from Whittaker, Clark, and Daniels, Inc. Other materials used are specified in the Examples.

EXAMPLE 1

100% PDMS, 30 Vol % Chromium Oxide

Sample slabs of chromium oxide-filled, addition-crosslinked poly(dimethylsiloxane) (PDMS) elastomer were prepared by mixing half of the PDMS siloxane, the crosslinking agent, a small amount of inhibitor, and half the filler on a three-roll mill as Part A. The second half of the PDMS, the catalyst, and the second half of the filler were mixed on a three-roll mill as Part B. Parts A and B were mixed together with thorough stirring. The mixture was degassed and injected into a mold of dimensions 12.7 cm×12.7 cm×0.19 cm, where it was cured for 10 hr. at 200° C.

The PDMS siloxane was a vinyl terminated poly(dimethylsiloxane) marketed by United Chemical Technologies, Inc., Piscataway, N.J., as PS442. This material is described by United Chemical Technologies, Inc. as having a nominal viscosity of 0.5 Pa s. (Molecular weights and viscosities for products of United Chemical Technologies, Inc. are from product literature. Molecular weights provided therein are not designated as such, but are all consistent as being number average.) The weight average molecular weight ($M_w$) of PS442 was determined as indicated in Table 1. A sample of PS442 was analyzed by size exclusion chromatography (SEC) in toluene using three PLgel Mixed B 7.5×300 mm mixed bed columns (Polymer Laboratories, Inc., Amherst, Mass.). The column set was calibrated with narrow-molecular weight distribution polystyrene standards between 595 and 2,750,000 daltons. Distributions and molecular weight averages were not corrected for axial dispersion. The long term precision of $M_w$ (weight average molecular weight) for a broad polystyrene standard using this method is ±5%.

The siloxane polymer PS442 was added as a reactant so as to provide a final concentration of 65.98 volume percent (28.56 weight percent).

The crosslinking agent used was a trimethylsilyl-terminated polymethylhydrosiloxane marketed by United Chemical Technologies, Inc., as PS123. This material has a viscosity of 0.025 to 0.030 Pascal second (Pa s), a molecular weight of 2,000 to 2,500, and a methylhydro weight percentage of 30 to 35 (with the remainder dimethyl). The crosslinker was added to provide a volume percentage of 4.42 (2.95 weight percent). Chromium oxide particles were added to provide a concentration of 30 volume percent (69.73 weight percent).

The catalyst used was added to provide a volume percentage of 0.24 (0.14 wt %). The catalyst was added in the form of a solution prepared by mixing 1 part by weight of product PC075 and 9 parts by weight of product PS441.2, both marketed by United Chemical Technologies, Inc. Product PC075 is a neutral platinum divinyl complex (2–3% platinum concentration) of chloroplatinic acid and cyclovinylmethyl siloxane. PS441.2 is a vinyldimethyl terminated polydimethylsiloxane having a viscosity of 0.2 Pa s. The inhibitor used was PT 67, sold by Wacker Silicones Corporation, Adrian, Mich. It was added to provide a volume percentage of 0.33 (0.14 wt %).

Circular disks (12 mm diameter) were cut from the slab. The storage modulus determination was done in accordance with the method of calculation described in Fitzgerald, et al., "The Effect of Cyclic Stress on the Physical Properties of a Poly(dimethylsiloxane) Elastomer", Polymer Engineering and Science, Vol. 32, No. 18 (September 1992), pp. 1350–1357. Six of the circular disks were stacked, one upon the other, weighed, and then placed in a test instrument called a Mechanical Energy Resolver (also referred to herein as an "MER"), commercially available from Instrumentors, Inc. Strongsville, Ohio, U.S.A. The instrument heated the stack to 218° C. and imposed a static compressive force of 8 kg on the stack. The length of the stack under the initial compressive force was then measured, as was the initial hardness (expressed in terms of "Initial storage modulus"). The MER then imposed cyclic stress on the sample stack by sinusoidally varying the initial compressive force by 4 kilogram root mean square (kg rms) at a frequency of 30 Hz for 60 hours, while maintaining the 218° C. temperature. After 60 hours, the final hardness ("Final storage modulus") and length of the six-disk stack under the static 8 kg compressive force were measured, as was the final weight of the sample stack. Results of these tests are summarized in Table 2.

Swell of the elastomer in polydimethylsiloxane release oil was measured by weighing a piece of slab prior to immersion in 0.350 Pa s polydimethylsiloxane oil marketed by Dow Corning Corp. of Midland, Mich. as DC200. The slab was incubated in oil for 7 days at 175° C., blotted dry, and weighed again. The percentage change in weight is designated "Oil swell" in Table 2.

Thermal conductivity was measured using a Holometrix™ TCA-100 thermal conductivity analyzer at 175° C.

EXAMPLE 2

100% PDMS, 10 Vol % Chromium Oxide

Elastomer was prepared and analyzed in substantially the same manner as in Example 1, except as follows. The chromium oxide filler was added to a concentration of 10 vol % (37.39 wt %). The siloxane polymer PS442 was added as a reactant so as to provide a final concentration of 84.84 volume percent (59.06 weight percent). The crosslinker was added to provide a volume percentage of 4.42 (2.95 weight percent). The inhibitor was added to provide a volume percentage of 0.42 (0.30 wt %). The catalyst used was added to provide a volume percentage of 0.31 (0.30 wt %). Results are presented in Table 2.

EXAMPLE 3

100% PDMS, 40 Vol % Chromium Oxide

Elastomer was prepared and analyzed in substantially the same manner as in Example 1, except as follows. The chromium oxide filler was added to a concentration of 40 vol % (78.18 wt %). The siloxane polymer PS442 was added as a reactant so as to provide a final concentration of 56.56 volume percent (20.58 weight percent). The crosslinker was added to provide a volume percentage of 2.95 (1.03 weight percent). The inhibitor was added to provide a volume percentage of 0.28 (0.10 wt %). The catalyst used was added to provide a volume percentage of 0.21 (0.10 wt %). Results are presented in Table2.

EXAMPLE 4

100% PDMS, 30 Vol % Chromium Oxide

Elastomer was prepared and analyzed in substantially the same manner as in Example 1, except that the poly (dimethylsiloxane) used was a vinyl-terminated poly (dimethylsiloxane) marketed by United Chemical Technologies, Inc., as PS445. This material is described by United Chemical Technologies, Inc., as having a nominal viscosity of 10 Pa s. Its molecular weight was analyzed by SEC, as described in Example 1, and the results are shown in Table 1. Analysis results for the material of this Example are presented in Table 2.

COMPARATIVE EXAMPLE 1

16% Diphenylsiloxane, 30 Vol % Chromium Oxide

Elastomer was prepared and analyzed in substantially the same manner as in Example 1, except the siloxane used was a vinyl terminated poly(diphenylsiloxane-co-dimethylsiloxane) marketed by United Chemical Technologies, Inc., as PS782. PS782 contains 16 mole percent diphenylsiloxane and 84 mole percent dimethylsiloxane. This material is described by United Chemical Technologies, Inc. as having a molecular weight of 9,300 and a nominal viscosity of 0.5 Pa s. A sample of PS782 was analyzed by size exclusion chromatography (SEC) in tetrahydrofuran using three PLgel Mixed B 7.5×300 mm mixed bed columns (Polymer Laboratories, Inc., Amherst, Mass.). The column set was calibrated with narrow-molecular weight distribution polystyrene standards between 595 and 2,750,000 daltons. Distributions and molecular weight averages were not corrected for axial dispersion. The long term precision of $M_w$ (weight average molecular weight) for a broad polystyrene standard using this method is ±5%. Its molecular weight is shown in Table 1. The siloxane was added so as to provide a final concentration of 65.98 volume percent (28.56 weight percent). Results are presented in Table 2.

COMPARATIVE EXAMPLE 2

24% Diphenylsiloxane, 30 Vol % Chromium Oxide

Elastomer was prepared and analyzed in substantially the same manner as in Example 1, except the siloxane used was a vinyl terminated poly(diphenylsiloxane-co-dimethylsiloxane) marketed by United Chemical Technologies, Inc., as PS793. PS793 is 23.5 mole percent diphenyl and 76.5 mole percent dimethyl. This material is described by United Chemical Technologies, Inc. as having a molecular weight of 13,200 and a nominal viscosity of 1.5 Pa s. Its molecular weight was analyzed by SEC, as described in Comparative Example 1, and the results are shown in Table 1. The siloxane was added so as to provide a final concentration of 65.98 volume percent (28.56 weight percent). Results are presented in Table 2.

COMPARATIVE EXAMPLE 3

100% PDMS, 30 Vol % Aluminum Oxide

Elastomer was prepared and evaluated in substantially the same manner as in Example 1, except as follows. The siloxane polymer PS442 was added as a reactant so as to provide a final concentration of 65.98 volume percent (34.24 weight percent). The crosslinker was added to provide a volume percentage of 3.44 (1.71 weight percent). The inhibitor was added to provide a volume percentage of 0.33 (0.17 wt %). The catalyst used was added to provide a volume percentage of 0.24 (0.17 wt %). The chromium oxide was replaced by aluminum oxide having a final concentration of 30.0 volume percent (63.71 weight percent). Results are presented in Table 2.

COMPARATIVE EXAMPLE 4

100% PDMS, 30 Vol % Calcium Oxide

Elastomer was prepared and evaluated in substantially the same manner as in Example 1, except as follows. The siloxane polymer PS442 was added as a reactant so as to provide a final concentration of 65.98 volume percent (38.71 weight percent). The crosslinker was added to provide a volume percentage of 3.44 (1.94 weight percent). The inhibitor was added to provide a volume percentage of 0.33 (0.19 wt %). The catalyst used was added to provide a volume percentage of 0.24 (0.19 wt %). The chromium oxide was replaced by calcium oxide, obtained from Eastman Kodak Company, Rochester, N.Y., U.S.A., having a final concentration of 30.0 volume percent (58.97 weight percent). Results are presented in Table 2.

COMPARATIVE EXAMPLE 5

100% PDMS, 30 Vol % Titanium Oxide

Elastomer was prepared and evaluated in substantially the same manner as in Example 1, except as follows. The siloxane polymer PS442 was added as a reactant so as to provide a final concentration of 65.98 volume percent (33.17 weight percent). The crosslinker was added to provide a volume percentage of 3.44 (1.66 weight percent). The inhibitor was added to provide a volume percentage of 0.33 (0.17 wt %). The catalyst used was added to provide a volume percentage of 0.24 (0.17 wt %). The chromium oxide was replaced by titanium oxide, obtained from Aldrich Chemical Company, Inc., Milwaukee, Wis., U.S.A., having a final concentration of 30.0 volume percent (64.84 weight percent). Results are presented in Table 2.

COMPARATIVE EXAMPLE 6

100% PDMS, 30 Vol % Tungsten Oxide

Elastomer was prepared and evaluated in substantially the same manner as in Example 1, except as follows. The siloxane polymer PS442 was added as a reactant so as to provide a final concentration of 65.98 volume percent (22.65 weight percent). The crosslinker was added to provide a volume percentage of 3.44 (1.13 weight percent). The inhibitor was added to provide a volume percentage of 0.33 (0.11 wt %). The catalyst used was added to provide a volume percentage of 0.24 (0.11 wt %). The chromium oxide was replaced by tungsten oxide, obtained from Aldrich Chemical Company, Inc., Milwaukee, Wis., U.S.A., having a final concentration of 30.0 volume percent (76.00 weight percent). Results are presented in Table 2.

TABLE 1

Characteristics of Polysiloxanes

| Example or Comp. Example | Polymer | Dimethyl-siloxane content (mol %) | Diphenyl-siloxane content (mol %) | Viscosity (Pa s) | $M_w$ |
|---|---|---|---|---|---|
| 1,2,3,Comp. Ex. 3–6 | PS442 | 100 | 0 | 0.5 | 25,200 |
| 4 | PS445 | 100 | 0 | 10 | 74,200 |
| Comp. Example 1 | PS782 | 84 | 16 | 0.5 | 14,100 |
| Comp. Example 2 | PS793 | 76.5 | 23.5 | 1.5 | 13,000 |

TABLE 2

Properties of the Elastomers of the Examples and Comparative Examples

| Ex. or Comp. Ex. | Thermal cond. (W/mK) | Hardness (Shore A) | MER Initial S.M. (MPa) | MER Final S.M. (MPa) | MER ΔS.M. (%) | MER initial length (mm) | MER final length (mm) | MER Δ length (%) | MER weight loss (%) | Oil swell (%) |
|---|---|---|---|---|---|---|---|---|---|---|
| Ex. 1 | 0.58 | 82 | 7.343 | 7.758 | 5.7 | 12.625 | 11.848 | 6.2 | 1.04 | 5.4 |
| Ex. 2 | 0.41 | 43 | 1.850 | 1.600 | 13.5 | 11.484 | 10.507 | 8.5 | 1.65 | 7.7 |
| Ex. 3 | 0.69 | 86 | 6.830 | 8.927 | 30.7 | 12.351 | 11.884 | 3.8 | 1.04 | 5.8 |
| Ex. 4 | 0.69 | 65 | 3.231 | 2.851 | 11.8 | 11.845 | 9.525 | 19.6 | 1.09 | 5.2 |
| Comp. Ex. 1 | 0.63 | 60 | 6.015 | 11.269 | 87.4 | 11.452 | 11.064 | 3.4 | 3.33 | 1.2 |
| Comp. Ex. 2 | 0.64 | 58 | 6.849 | 15.249 | 123 | 12.407 | 11.930 | 3.8 | 3.98 | −0.6 |
| Comp. Ex. 3 | 0.50 | 68 | 3.842 | 1.988 | 48.3 | 11.652 | 3.893 | 66.6 | 9.75 | 12 |
| Comp. Ex. 4 | 0.50 | 78 | 5.885 | 12.603 | 114 | 12.418 | 10.904 | 12.2 | 4.43 | 20 |
| Comp. Ex. 5 | 0.45 | 83 | 6.402 | 13.856 | 107 | 13.306 | 11.802 | 12.8 | 2.25 | 9 |
| Comp. Ex. 6 | 0.43 | 70 | 4.155 | 6.584 | 58.5 | 11.341 | 8.701 | 23.3 | 6.27 | 18 |

S.M. = Storage Modulus

The results in Table 2 indicate that the chromium oxide-filled elastomers of the Examples, on the whole, underwent significantly less creep, change in storage modulus, and weight loss during the 60 hour test as compared to the materials of the Comparative Examples. The differences in the change in storage modulus for the Examples and Comparative Examples were large and illustrate the surprisingly good mechanical properties of the chromium oxide-filled elastomers. The percent change in storage modulus for Examples 1 to 4 was 5.7 to 30.7%, whereas the percent change in storage modules for Comparative Examples 1 to 6 was 48.3 to 123%. Except for Comparative Examples 1 and 2 which contained diphenylsiloxane units in the elastomer, Examples 1–4 had much lower oil swell and MER weight loss volumes than the Comparative Examples. Further, the chromium oxide-filled elastomers possess desirable hardness and thermal conductivity values for fuser member materials.

The invention has been described in detail with particular reference to certain preferred embodiments thereof, but it should be appreciated that variations and modifications can be effected within the spirit and scope of the invention.

What is claimed is:

1. A fuser member comprising a support and a layer over said support, said layer comprising: an addition crosslinked non-aromatic substituted polyorganosiloxane elastomer and chromium oxide particles, said chromium oxide particles being present in said layer at a concentration of from about 5 to about 50 percent of the total volume of said layer.

2. The fuser member of claim 1 wherein said chromium oxide particle concentration is from about 10 to about 45 percent of the total volume of said layer.

3. The fuser member of claim 1 wherein said chromium oxide particle concentration is from about 20 to about 40 percent of the total volume of said layer.

4. The fuser member of claim 1 wherein said elastomer is the product of addition crosslinking vinyl substituted multifunctional siloxane polymer and multifunctional organo-hydrosiloxane.

5. The fuser member of claim 4 wherein said vinyl substituted multifunctional siloxane polymer consists essentially of repeating units having the general structures:

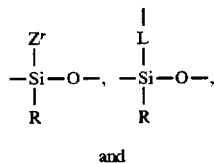

and

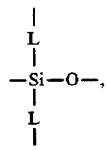

and and terminal units having the general structure:

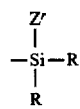

wherein

R is alkyl having from 1 to 8 carbons;

$Z^r$ is alkyl having from 1 to 8 carbons, or olefin having from 2 to 8 carbons and a terminal vinyl moiety; and L is —O—, or —$(CH_2)_e$—, where e is an integer from 1 to about 8;

with the proviso that at least two $Z^r$ moieties are olefinic groups having from 2 to 8 carbons.

6. The fuser member of claim 4 wherein said vinyl substituted multifunctional siloxane polymer has the general structure:

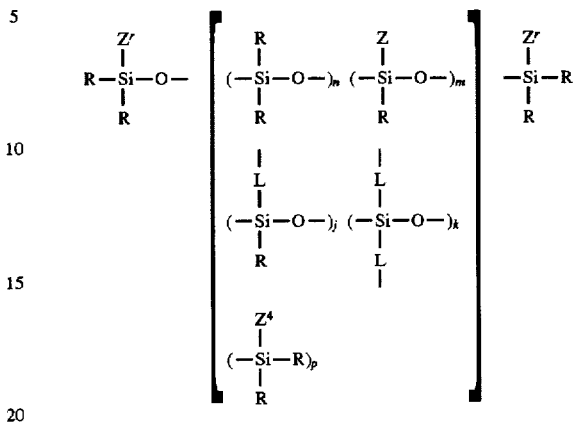

wherein

R is alkyl having from 1 to 8 carbons;

Z is an olefinic group having from 2 to 8 carbons and a terminal vinyl moiety;

$Z^r$ is alkyl having from 1 to 8 carbons, or olefin having from 2 to 8 carbons and a terminal vinyl moiety;

L is —O—, or —$(CH_2)_e$—, where e is an integer from 1 to about 8;

n, m, j, k and p are integers such that the molecular weight of said siloxane polymer is from 7,000 to 100,000;

j+k is less than 5 percent of the total of n+m+j+k; and $0 \leq p \leq (j+2k)$;

with the proviso that if m is 0 or 1, $Z^r$ is an olefinic group having from 2 to 8 carbons.

7. The fuser member of claim 6 wherein j+k is less than about 2 percent of the total of n+m+j+k.

8. The fuser member of claim 6 wherein said R groups are methyl.

9. The fuser member of claim 6 wherein said multifunctional organo-hydrosiloxane has the general structure:

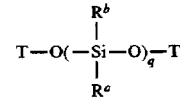

wherein each T represents:

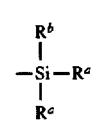

or both T's together represent atoms completing an organo-hydrosiloxane ring;

$R^b$ is H or $R^a$; and $R^a$ is alkyl having from 1 to 8 carbons;

with the proviso that at least two $R^b$ moieties are H.

10. The fuser member of claim 4 wherein said multifunctional organo-hydrosiloxane has the general structure:

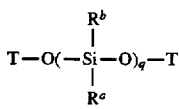

wherein each T represents:

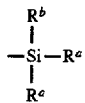

or both T's together represent atoms completing an organo-hydrosiloxane ring;

$R^b$ is H or $R^a$; and $R^a$ is alkyl having from 1 to 8 carbons;

with the proviso that at least two $R^b$ moieties are H.

11. The fuser member of claim 4 wherein said multifunctional organo-hydrosiloxane is selected from the group consisting of 1,3,5,7-tetramethylcyclotetrasiloxane; and compounds having the structural formula:

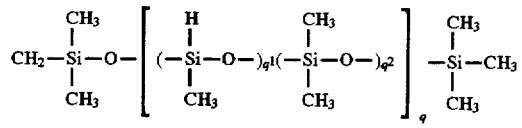

wherein $q^1+q^2=q$, and q is a number such that the molecular weight is from about 2,000 to 2,500, and $q^1$ is greater than or equal to 2.

12. The fuser member of claim 4 wherein said olefin substituted multifunctional siloxane polymer has the general structure:

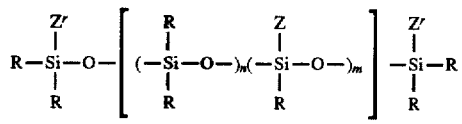

wherein

R is alkyl having from 1 to 8 carbons;

Z is an olefinic group having from 2 to 8 carbons and a terminal vinyl moiety;

$Z^r$ is alkyl having from 1 to 8 carbons, or olefin having from 2 to 8 carbons and a terminal vinyl moiety; and n and m are integers such that the molecular weight of said siloxane polymer is from 7,000 to 100,000;

with the proviso that at least two of the Z and $Z^r$ groups are olefin having from 2 to 8 carbons.

13. The fuser member of claim 12 wherein $Z^r$ is an olefin having from 2 to 8 carbons.

14. The fuser member of claim 13 wherein m is 0.

15. The fuser member of claim 13 wherein R is methyl.

16. The fuser member of claim 12 wherein each $Z^r$ is alkyl having from 1 to 8 carbons, and m is greater than or equal to 2.

17. The fuser member of claim 16 wherein R is methyl.

18. The fuser member of claim 4 wherein said vinyl substituted multifunctional siloxane polymer is selected from the group consisting of polymers having the structural formula:

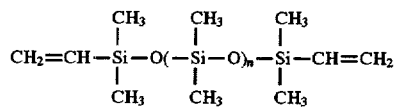

and the structural formula:

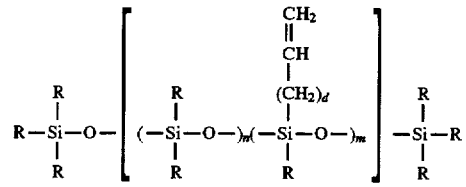

wherein, in the above formulas, d is an integer from 0 to 6; and the molecular weight of said multifunctional siloxane polymer is from 7,000 to 100,000.

19. A fuser member comprising a core and a layer overlying said core, said layer comprising: an addition crosslinked polyorganosiloxane elastomer, said elastomer being the addition product of:

(A) vinyl substituted multifunctional siloxane polymer having the general structure:

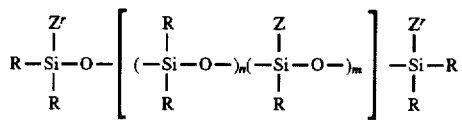

wherein

R is alkyl having from 1 to 8 carbons;

Z is an olefinic group having from 2 to 8 carbons and a terminal vinyl moiety;

$z^r$ is alkyl having from 1 to 8 carbons, or olefin having from 2 to 8 carbons and a terminal vinyl moiety;

n and m are integers such that the molecular weight of said siloxane polymer is from 7,000 to 100,000, with the proviso that if m is 0, $Z^r$ is an olefinic group having from 2 to 8 carbons and a terminal vinyl moiety; and (B) multifunctional organo-hydrosiloxane having the general structure:

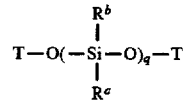

wherein each T represents:

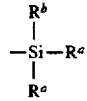

or both T's together represent atoms completing an organo-hydrosiloxane ring;

$R^b$ is H or $R^a$; and $R^a$ is alkyl having from 1 to 8 carbons;

with the proviso that at least two $R^b$ moieties are H;

said layer further comprising chromium oxide particles dispersed therein in a concentration of from about 20 to about 40 percent of the total volume of said layer.

20. The fuser member of claim 19 wherein said vinyl substituted multifunctional siloxane polymer has the general structure:
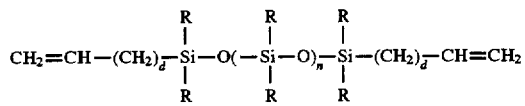
or the general structure:
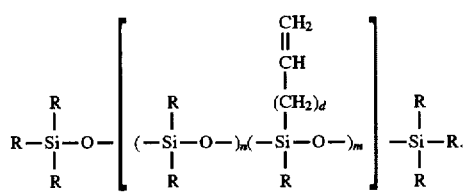
* * * * *